United States Patent [19]

Hamilton

[11] Patent Number: 4,639,740

[45] Date of Patent: Jan. 27, 1987

[54] LASER MARKING ENHANCEMENT SYSTEM USING REFLECTION FROM THE MASK

[75] Inventor: David C. Hamilton, Cottingham, England

[73] Assignee: Laser Applications Limited, Hull, England

[21] Appl. No.: 720,299

[22] Filed: Apr. 5, 1985

[51] Int. Cl.⁴ .............. G01D 9/00; G01D 9/42; G02B 5/30; G03B 27/02

[52] U.S. Cl. .............. 346/76 L; 346/107 R; 346/1.1; 350/403; 355/78

[58] Field of Search .............. 346/76 L, 107 R, 108, 346/1.1, 160; 219/121 L, 121 LM, 121 LA; 355/78; 350/403; 430/945

[56] References Cited

U.S. PATENT DOCUMENTS 3,588,439 6/1971 Heller .............. 346/76 L
3,657,510 4/1972 Rothrock .............. 219/121 LA
4,523,849 6/1985 Stone .............. 350/399

*Primary Examiner*—E. A. Goldberg
*Assistant Examiner*—Mark Reinhart
*Attorney, Agent, or Firm*—John S. Hale

[57] ABSTRACT

A method and apparatus for laser marking of an article in which a pulsed, linearly polarized laser beam is passed through a stencil-type mask and imaged onto an article to be marked.

In order to increase the overall transmission and hence the efficiency of the process, at least part of the laser beam energy which is reflected from the opaque parts of the mask is collected and redirected to the mask. The apparatus includes means for separating by beam polarization that portion of the laser radiation reflected by the opaque parts of the stencil and means for reflecting said portion of the radiation back to the stencil.

11 Claims, 6 Drawing Figures

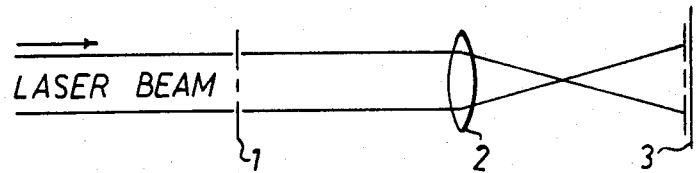
*Fig_1.* PRIOR ART
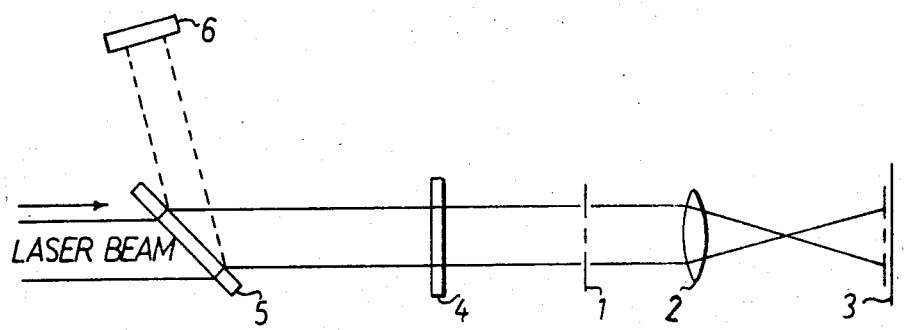
*Fig_2.*
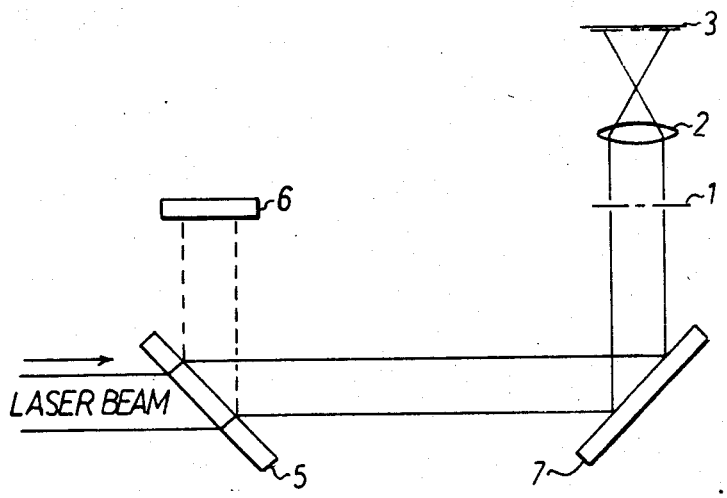
*Fig_3.*

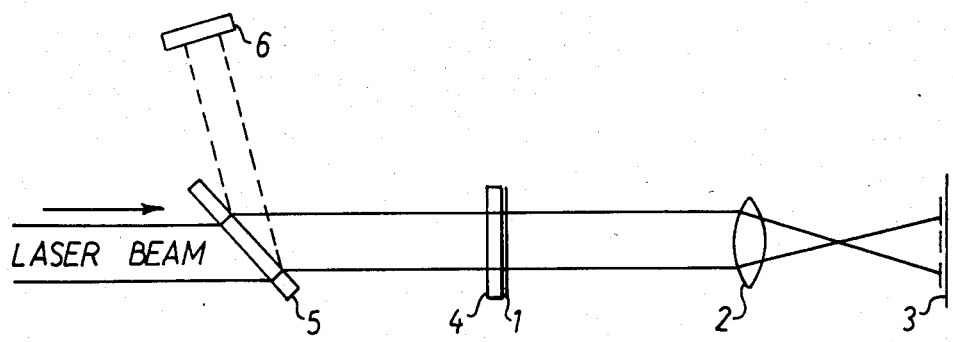
Fig_4.
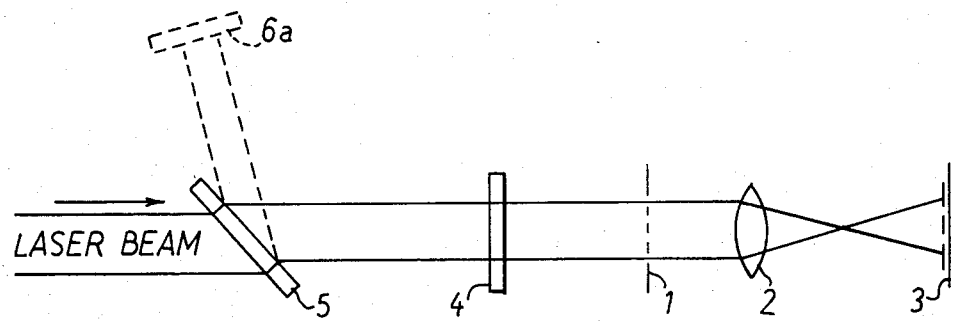
Fig_5.
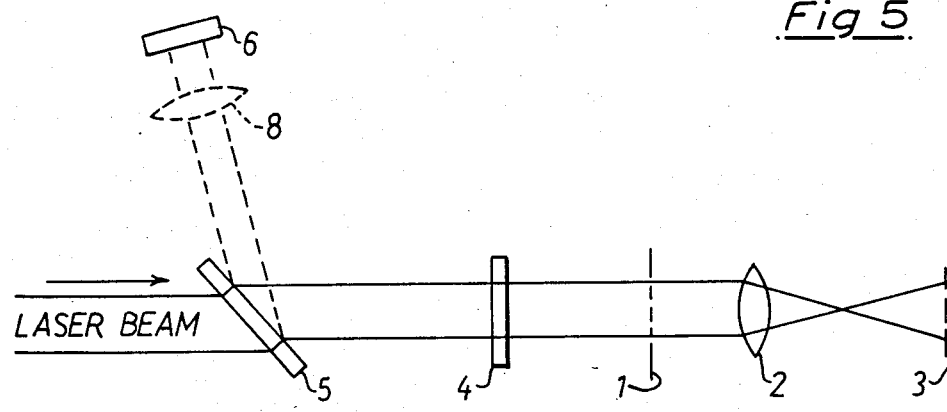
Fig_6.

LASER MARKING ENHANCEMENT SYSTEM USING REFLECTION FROM THE MASK

This invention relates to the use of lasers for marking information on articles.

In a well-known technique commonly in use, a pulsed laser beam is passed through a mask and imaged onto an article by a lens. Provided the laser pulse is intense enough and provided the article surface is absorptive at the laser wavelength, the effect of the laser beam is to vaporise, or otherwise chemically change, the surface of the article to be marked. For a given material, the area bounded by the mark produced is proportional to the energy density on the material.

However, since the mask is in the form of a stencil containing the information to be marked, only that part of the laser beam which passes through the open parts of the stencil is actually imaged onto the article to form the mark, while that part of the beam which is obstructed by closed parts of the stencil is normally reflected from the stencil and lost. A typical mask arrangement will transmit 25% of the incident energy, and reflect 75%. Thus, this marking technique is wasteful and inefficient in terms of its use of the output energy of the laser.

Since the area which can be marked on an article is characterised by the energy density incident on the article, it will be appreciated that if more energy could be transmitted through a given mask, the area covered by the mark on the article would be increased.

It is an object of the present invention to provide a laser marking technique which enables a greater proportion of the laser energy to be transmitted by a given mask to an object to be marked.

In accordance with the present invention, at least part of the energy which is reflected from the mask is collected and redirected to the mask, particularly the open areas of mask, thus increasing the overall transmission and hence the efficiency of the process. The invention takes advantage of the polarization properties of radiation, particularly inasmuch as these properties can be used with a polarization sensitive beamsplitter to discriminate between different parts of a radiation field. By using a pulsed, linearly polarized laser beam and by detecting the radiation which is reflected from the mask, and separating this from the incident radiation, it is possible to reflect this radiation back on to the mask so that a further percentage of the total radiation field is transmitted by the mask.

The invention is described further hereinafter, by way of example only, with reference to the accompanying drawings, in which:

FIG. 1 diagrammatically illustrates a known technique for laser marking;

FIG. 2 diagrammatically illustrates a first embodiment of a laser marking apparatus in accordance with the present invention;

FIG. 3 diagrammatically illustrates a second embodiment of a laser marking apparatus in accordance with the present invention; and FIGS. 4, 5 and 6 illustrate three further embodiments in accordance with the invention.

In the known technique illustrated in FIG. 1, a pulsed laser beam is passed through a mask or stencil 1 and imaged by a lens 2 onto an article 3 which is to be marked. In this arrangement, that part of the laser beam which is obstructed by the closed parts of the stencil 1 is largely reflected by the stencil 1 and lost.

In the description of the embodiments in accordance with the present invention which follow, parts which correspond to those already described are given the same reference numerals.

The laser beam, which is arranged to be linearly polarized in the plane of the drawing, is incident from the left, and first passes through a polarization sensitive beamsplitter 5. This may be, for example, an uncoated optical flat which is set at Brewster's angle, or else, preferably, an optical flat which is set at Brewster's angle or some other angle, and with a suitable coating deposited on one surface, the other surface being anti-reflection coated. As is well known to those skilled in the art, a beamsplitter set in the manner shown and described will efficiently transmit radiation polarized as described (this direction of polarization is commonly referred to as p-plane with respect to the beamsplitter, whereas the orthogonal plane of polarization, i.e. in a direction into the plane of the drawing, is commonly known as S-plane).

After being transmitted through the beamsplitter 5, the laser beam passes through a quarter waveplate 4. A quarter waveplate 4, as is well known in the art, will convert a linearly polarized beam to a circularly polarized beam. The resulting circularly polarized beam is then incident on the mask 1, where parts are either transmitted or reflected, depending upon whether they encounter open or closed parts of the mask. That fraction of the beam which is reflected from the mask again passes through the quarter waveplate 4, and that part of the reflected beam which is not depolarized by the reflection (such depolarisation typically being a small percentage of the total) is converted to a beam which is now linearly polarized in a direction othogonal to the original plane of polarization, i.e. the S plane with respect to the beamsplitter 5. Thus it is reflected from the beamsplitter 5 to a mirror 6, from where it is returned via the beamsplitter 5 and quarter waveplate 4 to the mask 1. It will be appreciated that by suitably adjusting the mirror 6, that part of the laser beam which was reflected from the mask can be redirected so that more of the beam is transmitted through the mask. That part of the beam which is reflected from the mask during the second transit is transmitted back through the beamsplitter 5, from where a percentage may be reflected back into the system described by the laser optics. Thus the net effect is to increase the total percentage of the laser beam which is transmitted by the mask.

In a further embodiment of the present invention illustrated in FIG. 6, an optical component 8 can be inserted between the beamsplitter 5 and the mirror 6 so as to "scramble" the reflected beam, so that, instead of a beam which is non-uniform (this resulting from the non-uniform first reflection from the mask) a much more homogeneous beam is reflected back into the system. It is important however, that such "scrambling" of the beam should substantially retain the polarization properties of the beam, or else the concept of selection by polarization does not work. As indicated diagrammatically in FIG. 6, the optical component 8 as here described can take the form, for example, of a multi-faceted lens or some other compound lens system. To the same end, the planar mirror 6 can be replaced by a multi-faceted mirror 6a as in the embodiment illustrated diagrammatically in FIG. 5.

Another embodiment of the present invention illustrated diagrammatically in FIG. 4 combines the quarter waveplate and the mask, whereby, instead of having a discrete quarter waveplate and a metallic stencil type mask, the mask 1 is actually evaporated, or otherwise deposited, on the second surface of the waveplate 4. In this case the mask can be a metallic or a dielectric coating, the main requirement being that the coating is highly reflective where the "solid" parts of the mask would be.

This latter embodiment has several advantages, viz

1. No "Landings" are necessary to hold the solid parts together, as in a conventional stencil.

2. The "empty" parts of the mask need not necessarily be 100% transmissive, but, by suitably depositing coatings, may provide any percentage reflection required. This may be useful, for example, in some "scrambling" schemes.

3. The composite piece is much less likely to become misaligned when the mask is disturbed for whatever reason.

Yet another embodiment employs the arrangement shown in FIG. 3. In this case, the quarter waveplate is replaced by a suitably constructed mirror 7, which has the same properties as a quarter waveplate, except that it works by reflection and not by transmission. One advantage of this embodiment is that the mirror 6, beamsplitter 5, polarizing mirror 7, and mask holder, can be assembled as a single unit, offering substantial improvements in manufacturing cost, and system alignment.

I claim:

1. A method of laser marking of an article of the type in which a stencil-type mask having opaque parts and open parts is imaged onto an article to be marked by passing a pulsed laser beam through the open parts of the stencil-type mask and onto the article to be marked, wherein the pulsed laser beam is caused to be linearly polarized and wherein at least part of the laser beam energy is reflected from the opaque parts of the mask and is collected and redirected to the mask to thereby increase the overall transmission and hence the efficiency of the process.

2. An apparatus for laser marking of an article in which a pulsed, linearly polarized laser beam is passed onto and through a stencil having opaque parts to an article to be marked, said apparatus comprising means for separating a first portion of the laser radiation which is reflected by the opaque parts of the stencil from the laser radiation directed to the stencil, and means for reflecting said first portion of the radiation back onto and through the stencil so that a further proportion of the total radiation field is transmitted by the stencil.

3. An apparatus according to claim 2 wherein said separation is effected by detecting a change of polarization of that portion of the laser radiation reflected by the opaque parts of the stencil.

4. An apparatus which uses a laser beam, linearly polarized in a first plane, for laser marking of an article via a stencil, the apparatus comprising a polarization-sensitive beam-splitter, a circularly polarizing means, a mirror device, and a stencil having open portions and opaque portions, in which said polarization-sensitive beam-splitter selectively transmits said polarized beam to said stencil via said circularly polarizing means whereby a first part of the circularly polarized radiation is transmitted through the open portions of the stencil to said article and a second part is reflected by the opaque portions of the stencil back through the circularly polarizing means where said second part becomes linearly polarized in a second plane different to said first plane so that on reaching the beam-splitter said second part is reflected away from the laser and towards said mirror device which is arranged to reflect said second part back towards the stencil by way of further reflection at the beam-splitter and transmission through the circularly polarizing means.

5. An apparatus according to claim 4, wherein said circularly polarizing means is a quarter-wave plate.

6. An apparatus according to claim 3, wherein said circularly polarizing means comprises a polarizing mirror.

7. An apparatus according to claim 5 wherein the quarter-wave plate and the stencil are combined into a unitary component.

8. An apparatus according to claim 7 wherein the stencil is deposited, such as by evaporation, on the downstream surface of the quarter-wave plate, considered in the direction of the laser beam.

9. An apparatus according to claim 4 including means for scrambling said second part after first reflection by said beam-splitter to increase the homogeneity of said second part reflected back by said mirror device towards the stencil.

10. An apparatus according to claim 9 wherein to achieve said scrambling effect, said mirror device comprises a multi-faceted mirror.

11. An apparatus according to claim 9 wherein, to achieve said scrambling effect, said scrambling means comprises a multi-faceted lens disposed between said beam-splitter and said mirror device.

* * * * *